US010283948B2

(12) United States Patent
Matsumoto et al.

(10) Patent No.: US 10,283,948 B2
(45) Date of Patent: May 7, 2019

(54) ELECTRICAL CONNECTOR AND ELECTRICAL CONNECTOR ASSEMBLY

(71) Applicants: Tyco Electronics Japan G.K., Kanagawa (JP); Toyota Jidosha Kabushiki Kaisha, Aichi-ken (JP)

(72) Inventors: Tsugumi Matsumoto, Kanagawa (JP); Ryuichi Komiyama, Kanagawa (JP); Tomoyuki Funayama, Aichi-ken (JP)

(73) Assignees: Tyco Electronics Japan G.K., Kawasaki-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/631,525

(22) Filed: Jun. 23, 2017

(65) Prior Publication Data
US 2017/0373478 A1 Dec. 28, 2017

(30) Foreign Application Priority Data

Jun. 24, 2016 (JP) ................................. 2016-125744

(51) Int. Cl.
*H02G 3/08* (2006.01)
*H01R 13/52* (2006.01)
*H01R 33/965* (2006.01)
*H01R 13/533* (2006.01)
*H01R 13/629* (2006.01)

(52) U.S. Cl.
CPC ............. *H02G 3/088* (2013.01); *H01R 13/52* (2013.01); *H01R 13/5219* (2013.01); *H01R 13/533* (2013.01); *H01R 13/629* (2013.01); *H01R 33/9653* (2013.01); *H01R 2201/26* (2013.01)

(58) Field of Classification Search
CPC ................................ H01R 13/52; H02G 3/088
See application file for complete search history.

(56) References Cited

U.S. PATENT DOCUMENTS

| 4,654,470 A | 3/1987 | Feldman et al. |
| 5,310,075 A * | 5/1994 | Wyler ..................... F21V 31/00 |
| | | 174/50 |
| 9,231,334 B2 | 1/2016 | Hara |
| 2015/0162698 A1 | 6/2015 | Hara |

FOREIGN PATENT DOCUMENTS

| JP | US53-132627 | 3/1977 |
| JP | US54-45391 | 9/1977 |
| JP | 4124774 U | 11/1992 |
| JP | 719969 U | 4/1995 |

(Continued)

OTHER PUBLICATIONS

Abstract of JP2005108499, dated Apr. 21, 2005, 2 pages.

(Continued)

*Primary Examiner* — Briggitte R Hammond
(74) *Attorney, Agent, or Firm* — Barley Snyder

(57) ABSTRACT

An electrical connector comprises a housing having a water stop groove and a region disposed between an end of the housing and the water stop groove. The water stop groove extends along a circumferential direction of the housing orthogonal to a mating direction of the electrical connector. The water stop groove is dimensioned to allow a surface tension to act on a quantity of water accumulated in the region.

4 Claims, 10 Drawing Sheets

(56) References Cited

FOREIGN PATENT DOCUMENTS

| JP | 9120856 A | 5/1997 |
| JP | 200067989 A | 3/2000 |
| JP | 2005108499 A | 4/2005 |
| JP | 2013140821 A | 7/2013 |
| JP | 2014229489 A | 12/2014 |

OTHER PUBLICATIONS

European search report, dated Sep. 5, 2017, 8 pages.
Japanese Notification of Reasons for Refusal and English translation, dated May 16, 2018, 6 pages.
Abstract of JP2013140821, dated Jul. 18, 2013, 1 page.
Bstract of JP2000-67989, dated Mar. 3, 2000, 1 page.
Japanese Notice of Reasons for Refusal with English translation, Japanese Patent Application No. 2016-125744, dated Dec. 17, 2018, 6 pages.
Japanese Notice of Reasons for Refusal with English translation, Japanese Patent Application No. 2016-125744, dated Feb. 15, 2019, 7 pages.
Abstract of JP2014229489, dated Dec. 8, 2014, 1 page.

\* cited by examiner

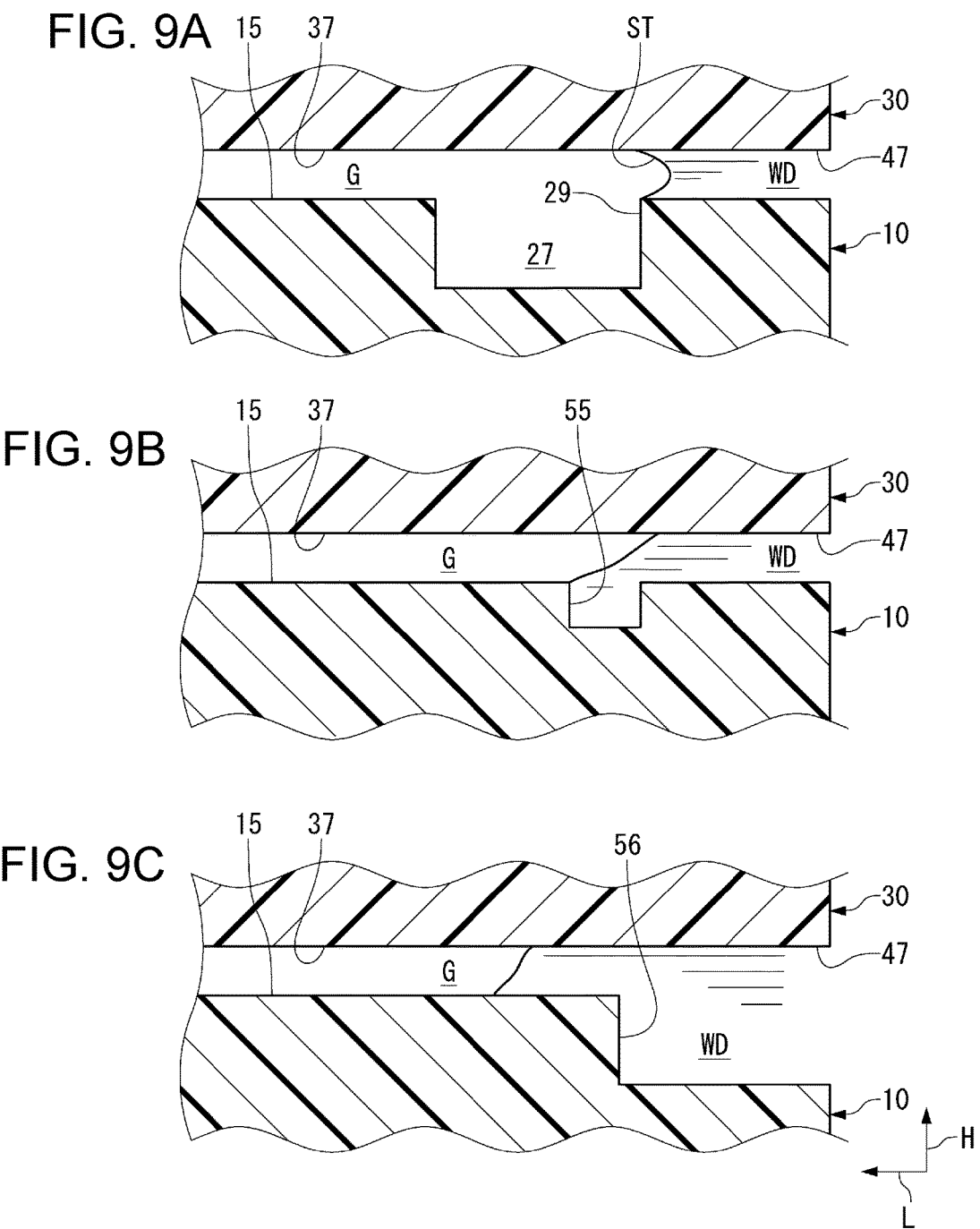

ELECTRICAL CONNECTOR AND ELECTRICAL CONNECTOR ASSEMBLY

CROSS-REFERENCE TO RELATED APPLICATION

This application claims the benefit of the filing date under 35 U.S.C. § 119(a)-(d) of Japanese Patent Application No. 2016-125744, filed on Jun. 24, 2016.

FIELD OF THE INVENTION

The present invention relates to an electrical connector and, more particularly, to a partially waterproof electrical connector.

BACKGROUND

Electrical connectors used for vehicles can be separated into two categories: those exposed to direct water contact and those not exposed to direct water contact. In the electrical connector corresponding to the former type, such as a connector used in an engine compartment, a rubber seal ring separate from a housing is interposed between, for example, a male housing and a female housing, thereby ensuring a high or fully waterproof performance. On the other hand, in electrical connectors corresponding to the latter type, such as a connector used for an electrical component within the vehicle, the waterproof performance is ensured by, for example, making some alterations on the structure of the housing instead of using the seal ring because only a light or partial waterproof performance is required.

Japanese Patent Application No. 2005-108499A, for example, discloses that water may spread through a small gap between the male housing and the female housing due to capillary action and may reach a terminal insertion hole which is located on the rear side of the electrical connector in the mating direction. JP 2005-108499A discloses that a recess is provided in the circumferential direction of the housing and water is accumulated in this recess, thereby preventing the water from flowing to the rear side of the electrical connector.

Although the waterproof performance is ensured until the recess of JP 2005-108499A is filled with water, when the amount of the water exceeds the capacity of the recess, the water overflows from the recess. Thus, when the structure disclosed in JP 2005-108499A is exposed to water which has exceeded a prescribed amount, the even light or partial waterproof performance of the connector is considerably impaired.

SUMMARY

An electrical connector according to the invention comprises a housing having a water stop groove and a region disposed between an end of the housing and the water stop groove. The water stop groove extends along a circumferential direction of the housing orthogonal to a mating direction of the electrical connector. The water stop groove is dimensioned to allow a surface tension to act on a quantity of water accumulated in the region.

BRIEF DESCRIPTION OF THE DRAWINGS

The invention will now be described by way of example with reference to the accompanying Figures, of which:

FIG. 9A is a detail sectional view of a water stop groove of the electrical connector assembly of FIG. 1A;

FIG. 9B is a detail sectional view of a first different groove of another electrical connector assembly;

FIG. 9C is a detail sectional view of a second different groove of another electrical connector assembly;

DETAILED DESCRIPTION OF THE EMBODIMENTS

Figure 1A:
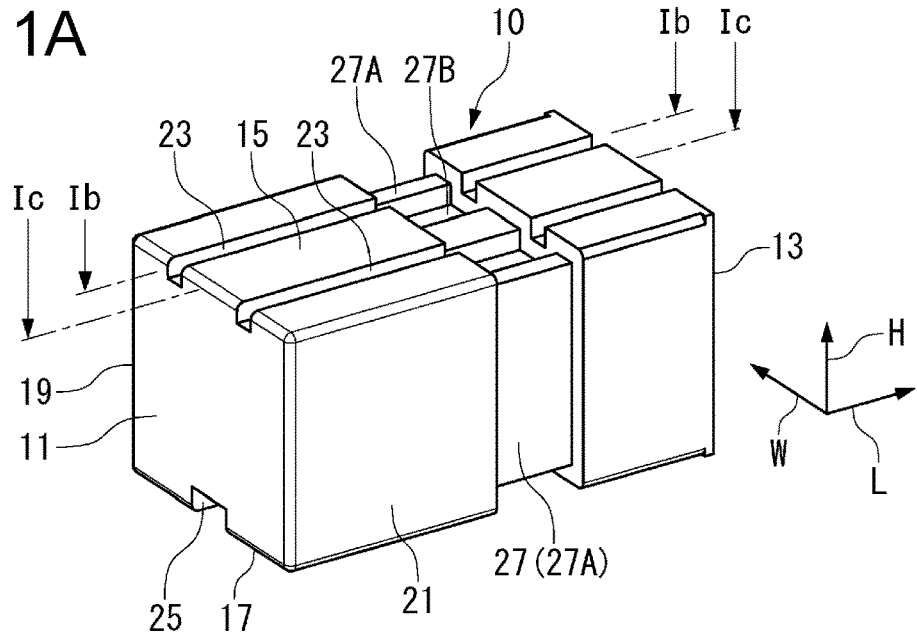
FIG. 1A is a perspective view of a first housing of an electrical connector assembly according to the invention.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

An electrical connector assembly 1 according to an embodiment of the invention is shown in FIGS. 1A-3B. The electrical connector assembly 1 includes a first housing 10 and a second housing 30. In the shown embodiment, the first housing 10 is a male housing holding a female contact (not shown) and forming a first electrical connector, and the second housing 30 is a female housing holding a male contact (not shown) and forming a second electrical connector. When the first housing 10 and the second housing 30 are mated together, the female contact and the male contact are electrically connected.

The first housing 10 and the second housing 30 will now be described in greater detail. In each of the first housing 10 and the second housing 30, a side where the first housing 10 and the second housing 30 are mated is defined as a front side and a side opposite to the front side is defined as a rear side. A direction connecting the front side and the rear side is defined as a mating direction L.

Figure 1B:
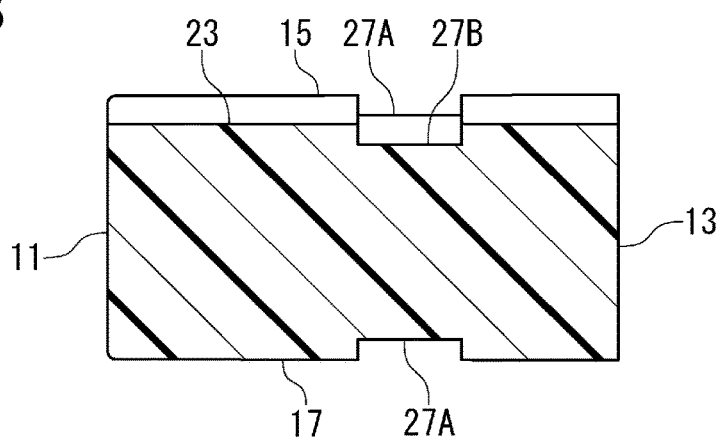
FIG. 1B is a sectional view of the first housing taken along line Ib-Ib of FIG. 1A.
Figure 1C:
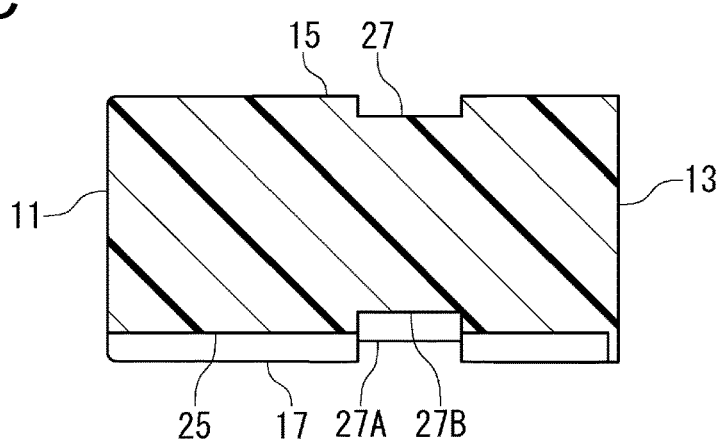
FIG. 1C is a sectional view of the first housing taken along line Ic-Ic of FIG. 1A.

The first housing 10 is shown in FIGS. 1A-1C. The first housing 10 is formed by injection-molding an electrically insulative resin. The first housing 10 has a front end 11 and a rear end 13 opposite the front end 11. The first housing 10 includes an upper wall 15, a lower wall 17, a left side wall 19, and a right side wall 21, which each connect the front end 11 and the rear end 13. The upper wall 15 and the lower wall 17 are provided in parallel at a predetermined distance in a height direction H, and the left side wall 19 and the right side wall 21 are provided in parallel at a predetermined distance in a width direction W. The left side wall 19 and the right side wall 21 are orthogonal to the upper wall 15 and the lower wall 17.

The upper wall 15, as shown in FIGS. 1A-1C, has a plurality of upper guide grooves 23. The upper guide grooves 23 are each hollowed by a predetermined depth from the upper wall 15 in a direction toward the lower wall 17. The upper guide grooves 23 penetrate through the front end 11 and the rear end 13 and are linearly formed. In the shown embodiment, two upper guide grooves 23 are formed at positions symmetric with respect to a center of the upper wall 15 in the width direction W at an interval in the width direction W.

The lower wall 17, as shown in FIGS. 1A-1C, has a lower guide groove 25. The lower guide groove 25 is hollowed by a predetermined depth from the lower wall 17 in a direction toward the upper wall 15. Like the upper guide grooves 23, the lower guide groove 25 penetrates through the front end 11 and the rear end 13 and is linearly formed. In the shown embodiment, the lower guide groove 25 is provided at the center in the width direction W.

The first housing 10, as shown in FIGS. 1A-1C, includes a water stop groove 27 extending along the circumferential direction of an outer peripheral surface of the first housing 10. In the shown embodiment, the water stop groove 27 is continuously formed along the entire outer peripheral surface in the circumferential direction of the first housing 10; the water stop groove 27 is formed in each of the upper wall 15, the lower wall 17, the left side wall 19, and the right side wall 21 and is orthogonal to the mating direction L. The water stop groove 27 is positioned closer to the rear end 13 than a center of the first housing 10 in the mating direction L. Parts of the water stop groove 27 that correspond with the upper guide grooves 23 and the lower guide groove 25 form deep grooves 27B, and the other parts of the water stop groove 27 form shallow grooves 27A.

Figure 2A:
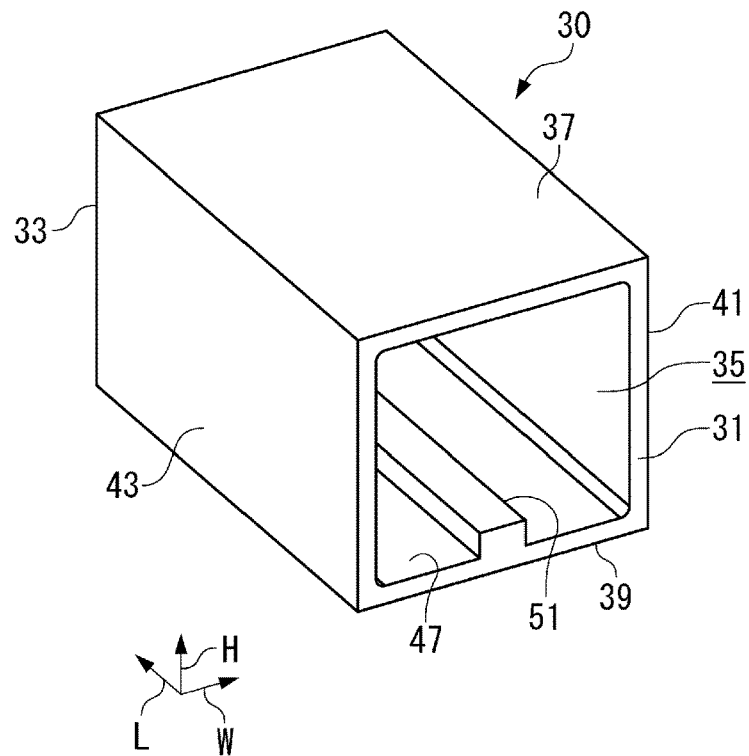
FIG. 2A is a perspective view of a second housing of the electrical connector assembly of FIG. 1A.
Figure 2B:
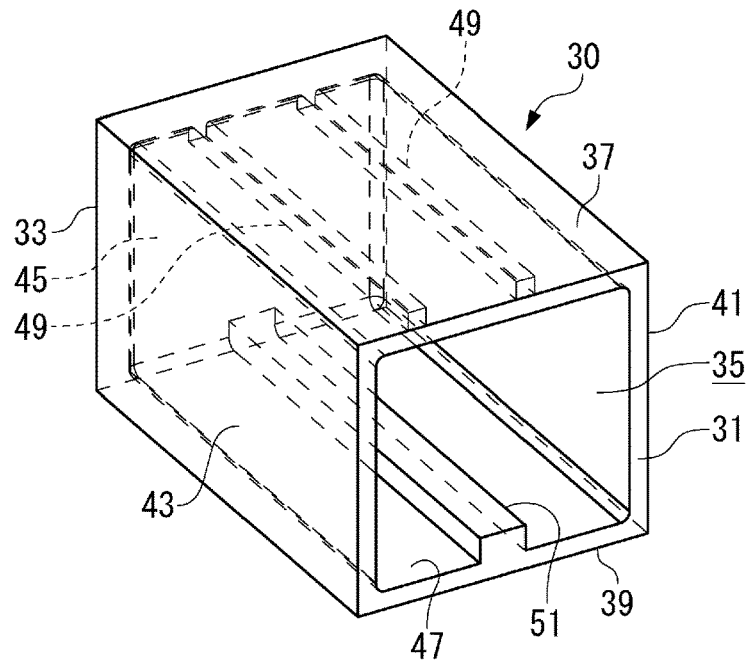
FIG. 2B is a partially transparent perspective view of the second housing of FIG. 2A.

The second housing 30 is shown in FIGS. 2A and 2B. The second housing 30 is formed by injection-molding an electrically insulative resin. The second housing 30 has a front end 31 and a back end 33 opposite the front end 31. The second housing 30 includes a receiving cavity 35 formed in a rectangular parallelepiped shape. The receiving cavity 35 is surrounded by an upper wall 37, a lower wall 39, a left side wall 41, a right side wall 43, and a back wall 45. The back wall 45 is disposed at the back end 33 and holds a male contact (not shown). A mating opening 47 is disposed at the front end 31.

An inner surface of the upper wall 37 that faces the receiving cavity 35, as shown in FIG. 2B, has a pair of upper guide ridges 49. An inner surface of the lower wall 39 that faces the receiving cavity 35 has a lower guide ridge 51. The upper guide ridges 49 extend along an entire length of the upper wall 37 in the mating direction L and are linearly formed. The lower guide ridge 51 extends along an entire length of the lower wall 39 in the mating direction L and is linearly formed.

Figure 3A:
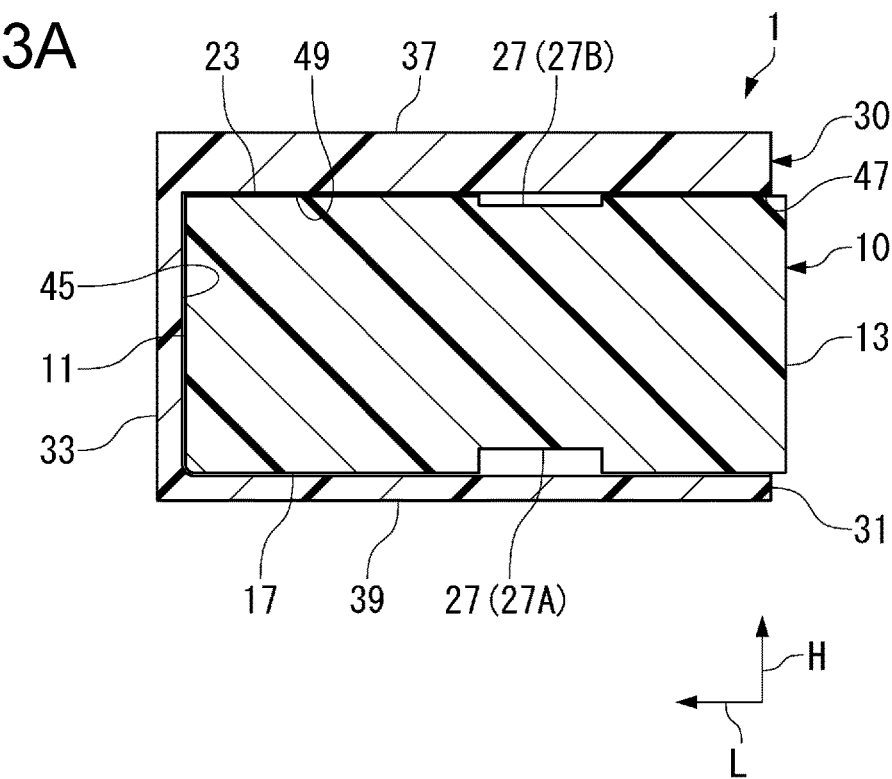
FIG. 3A is a sectional view of the electrical connector assembly corresponding to the section of FIG. 1B.
Figure 3B:
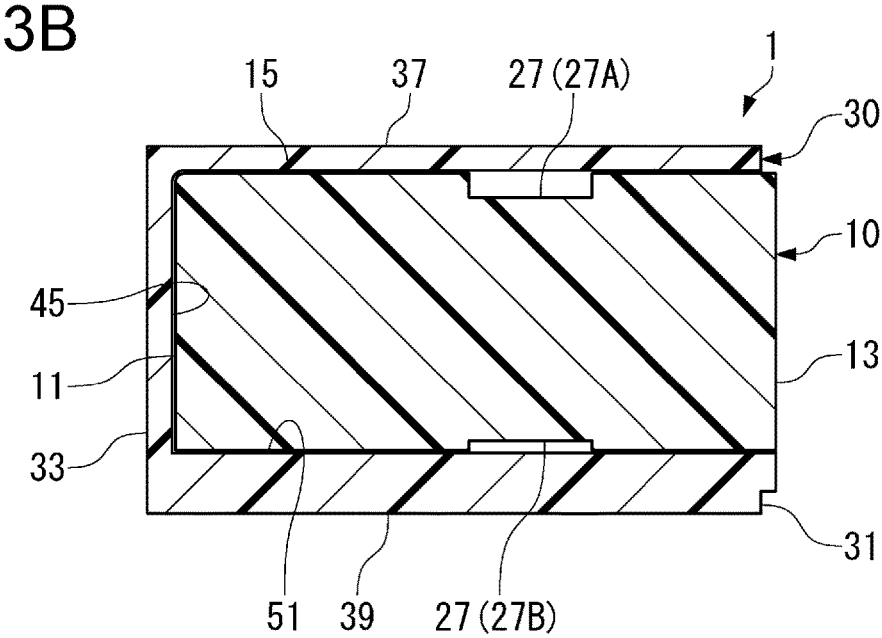
FIG. 3B is another sectional view of the electrical connector assembly corresponding to the section of FIG. 1C.

To mate the first housing 10 with the second housing 30, the front end 11 of the first housing 10 is inserted into the receiving cavity 35 of the second housing 30 through the mating opening 47 and the first housing 10 is pressed until the front end 11 reaches the back wall 45 of the second housing 30, bringing the electrical connector assembly 1 into a complete mating state shown in FIGS. 3A and 3B. The upper guide ridges 49 are inserted into the upper guide grooves 23, respectively, and the lower guide ridge 51 is inserted into the lower guide groove 25, which contributes to smooth mating of the first housing 10 and the second housing 30. The front end 11 and the back wall 45 are opposed to each other. The receiving cavity 35 accommodates the first housing 10 with a minimum gap formed between the first housing 10 and the second housing 30.

The operation of the electrical connector assembly 1 will now be described in greater detail with reference to FIGS. 9A-9C.

In the complete mating state of the electrical connector assembly 1, as shown in FIG. 9A, water WD may drop toward the mating opening 47 of the second housing 30. When the water WD reaches the mating opening 47, for example, the water WD enters a small gap G between the upper wall 15 of the first housing 10 and the upper wall 37 of the second housing 30. Because the gap G is narrow, capillary action occurs in the water WD which has entered the gap G, so that the water WD flows in a direction away from the mating opening 47. The flow of the water WD in the gap G between the upper wall 15 and the upper wall 37 has been described above, and the water WD similarly flows in other gaps such as a gap between the lower wall 17 of the first housing 10 and the lower wall 39 of the second housing 30, depending on the amount of the water WD.

The water may flow through the gap G between the upper wall 15 and the upper wall 37 due to capillary action and may reach the water stop groove 27, for example, when an amount of the water WD dropping to the mating opening 47 reaches a certain threshold. However, the flow of the water WD to the water stop groove 27 is stopped at a rear edge 29 of the water stop groove 27, so that the water WD does not easily fall down into the water stop groove 27. Since the gap G is narrow in a region in which the upper wall 15 and the upper wall 37 are opposed to each other, the water WD flows toward the front end 11 of the first housing 10, i.e., toward the front side in the mating direction L, due to capillary action.

However, when the water WD reaches the rear edge 29 of the water stop groove 27, the water WD is exposed to a wider space than the gap G. Accordingly, in a region of the first housing 10 that is positioned more forward than the rear edge 29, the capillary action no longer works, but a surface tension ST acts on the water WD accumulated in the region from the mating opening 47 to the water stop groove 27. As a result, the water WD tends to accumulate in the rear side from the rear edge 29 as shown in FIG. 9A. Therefore, although the water WD flows to the vicinity of the water stop groove 27, the water stop groove 27 functions as a stopper, which prevents the water from flowing to the front side of the water stop groove 27 in the mating direction L. This function is effective unless the water WD has sufficient energy to break the surface tension ST. In the shown embodiment, only one water stop groove 27 is integrally formed with the first housing 10; a plurality of water stop grooves 27 may alternatively be provided at intervals in the mating direction L.

The width and depth of the groove 27 determine whether the water stop groove 27 functions as a water stopper using surface tension ST; a groove 27 having a width of 2.5 mm and a depth of 1.0 mm shown in FIG. 9A can achieve the above-described water stop effect. However, these values are merely examples, and it is expected that the width and depth of the water stop groove 27 are determined depending on the specifications of the first housing 10 and the second housing 30.

By contrast, a first different groove 55 shown in FIG. 9B having a width of 0.5 mm and a depth of 1.0 mm cannot fully achieve the above-described water stop effect and water WD enters the groove 55. Accordingly, even when the first different groove 55 shown in FIG. 9B is disposed at a position similar to that shown in FIG. 9A, the different groove 55 does not perform water stopping by surface tension ST. Further, as shown in FIG. 9C, even when a second different groove 56 having dimensions similar to those of the water stop groove 27 of FIG. 9A is formed continuously with the mating opening 47, the second different groove 56 does not perform water stopping by surface tension ST.

When the water WD rushes to the mating opening 47, the surface tension ST may be broken and the water WD may enter the water stop groove 27. However, the water stop groove 27 further functions as a stopper until the water stop groove 27 is filled with the entering water WD.

An electrical connector assembly 2 according to another embodiment of the invention is shown in FIGS. 4A-6B. The basic structure of the electrical connector assembly 2 and the feature of the electrical connector assembly 2 that a waterproof performance is ensured to some extent by providing the water stop groove 27 are the same as those of the electrical connector assembly 1. However, in the electrical connector assembly 2, a plurality of upper guide grooves 24, a lower guide groove 26, a plurality of upper guide ridges 50, and a lower guide ridge 52 are provided only on the front side of the water stop groove 27. Elements of the electrical connector assembly 2 that are the same as those of the electrical connector assembly 1 are denoted by reference symbols in FIGS. 4A to 6B that are the same as those in FIGS. 1A to 3B, and thus descriptions thereof are omitted.

Figure 4A:
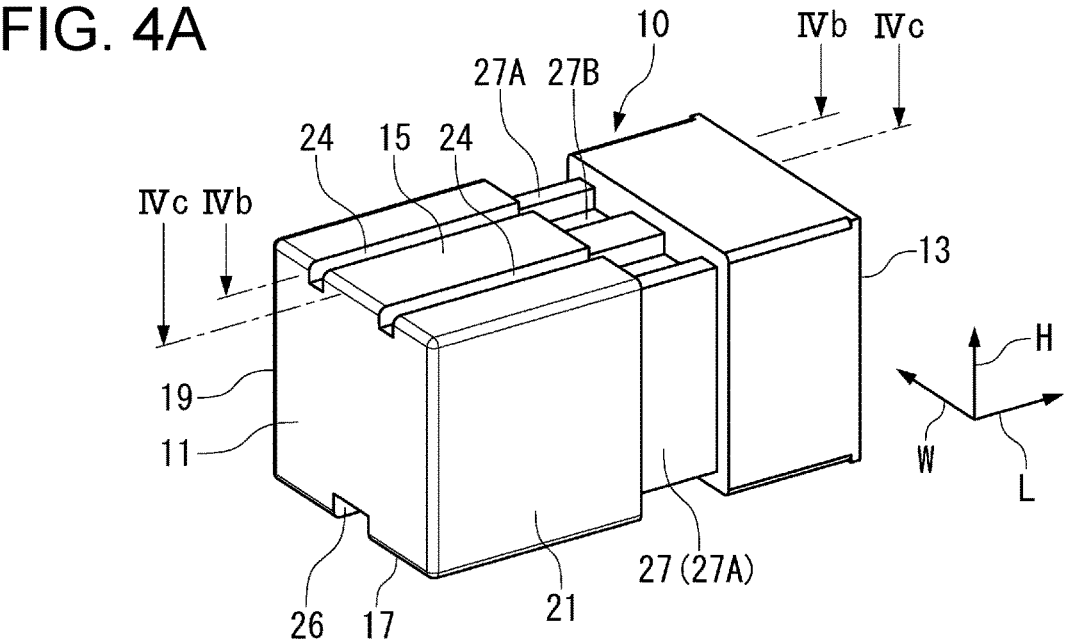
FIG. 4A is a perspective view of a first housing of another electrical connector assembly according to the invention.
Figure 4B:
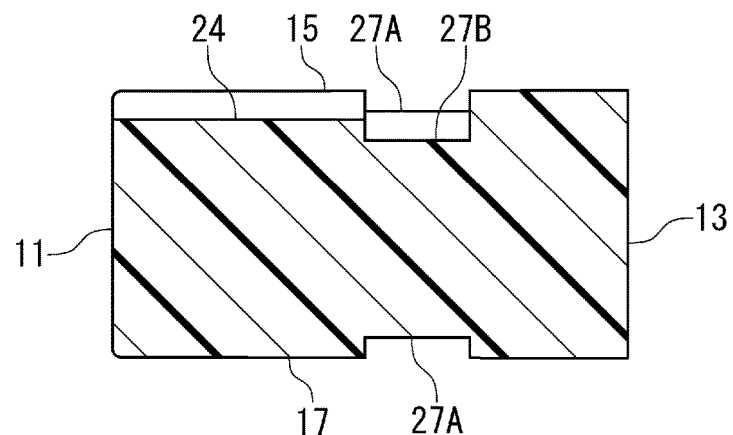
FIG. 4B is a sectional view of the first housing taken along line IVb-IVb of FIG. 4A.
Figure 4C:
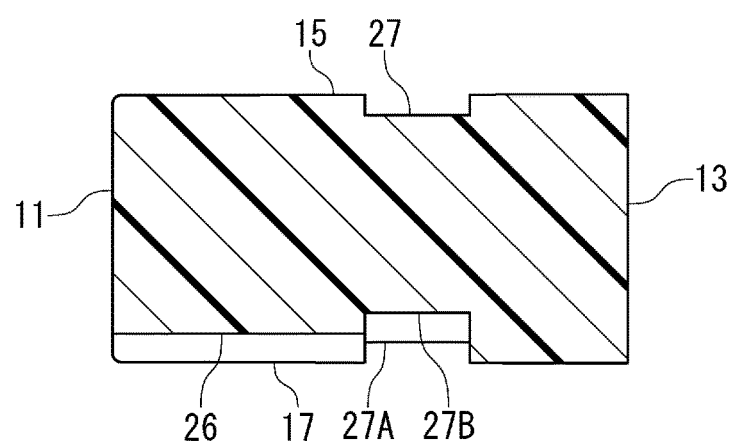
FIG. 4C is a sectional view of the first housing taken along line IVc-IVc of FIG. 4A.
Figure 5A:
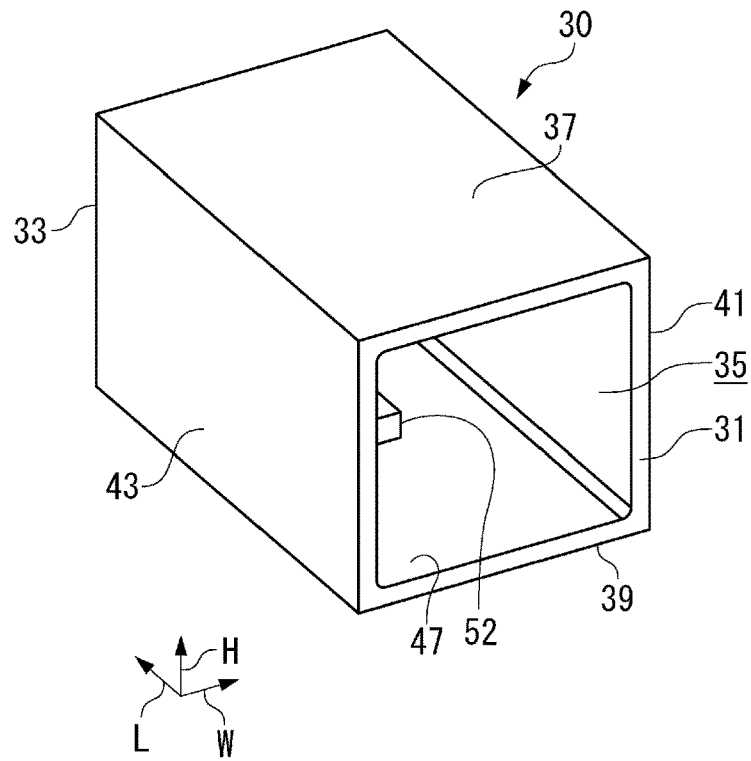
FIG. 5A is a perspective view of a second housing of the electrical connector assembly of FIG. 4A.
Figure 5B:
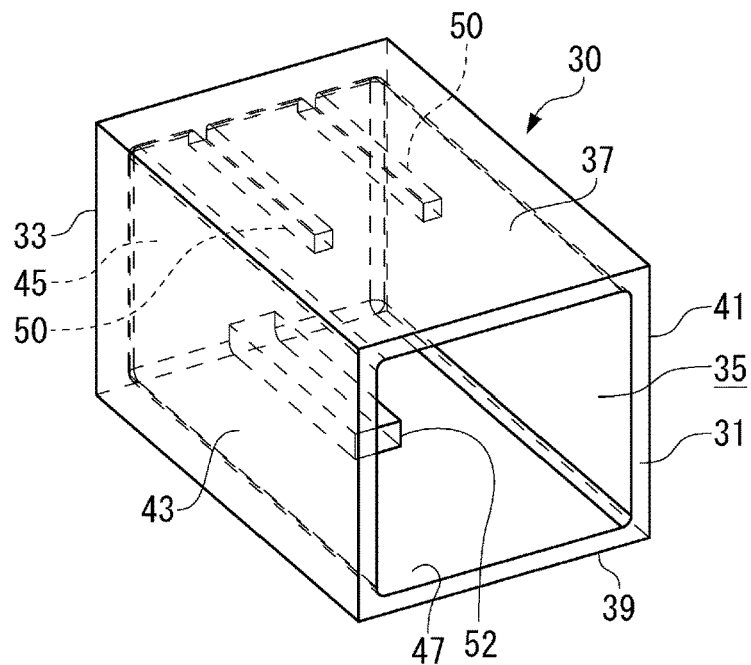
FIG. 5B is a partially transparent perspective view of the second housing of FIG. 5A.

As shown in FIGS. 4A-4C, in the electrical connector assembly 2, the first housing 10 has a structure in which the pair of upper guide grooves 24 and the lower guide groove 26 are disposed so as to penetrate from the front end 11 to the water stop groove 27, but are not disposed between the water stop groove 27 and the rear end 13. As shown in FIGS. 5A and 5B, the second housing 30 includes the upper guide ridges 50 and the lower guide ridge 52 having lengths respectively corresponding to the positions of the upper guide grooves 24 and the lower guide groove 26, which are shorter than those of the first embodiment. The upper guide ridges 50 and the lower guide ridge 52 are formed to extend only a predetermined distance from the back wall 45 toward the front end 31.

Figure 6A:
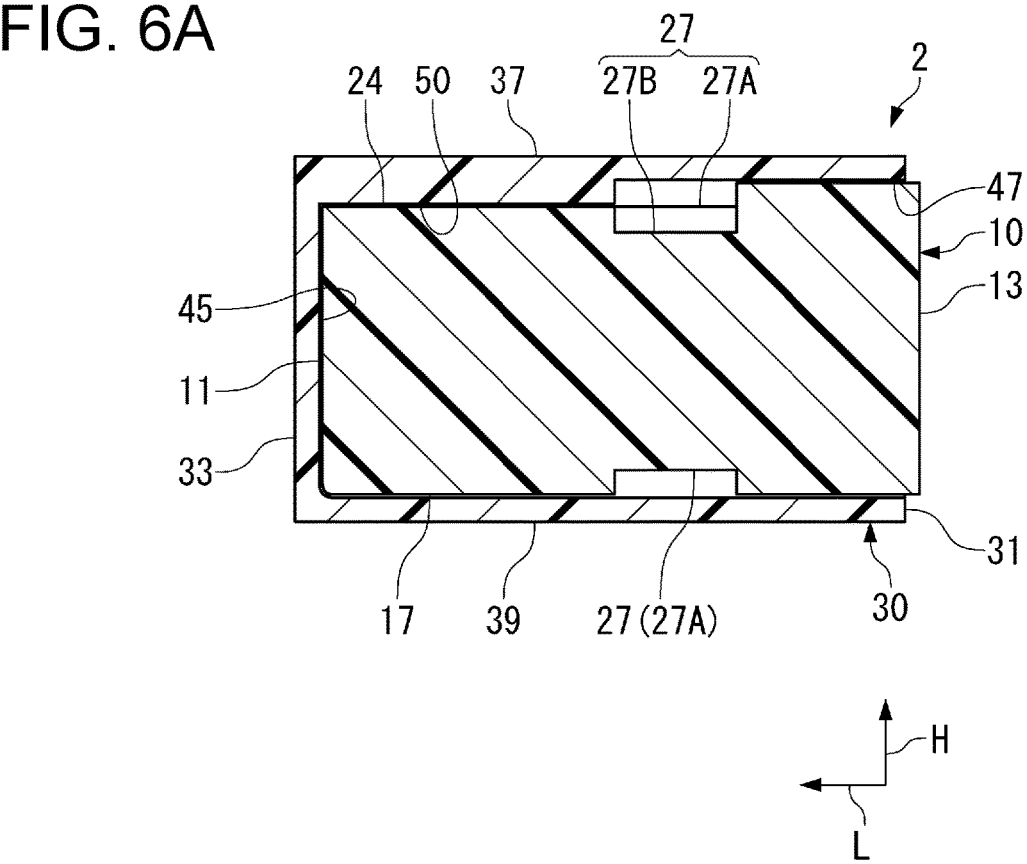
FIG. 6A is a sectional view of the electrical connector assembly corresponding to the section of FIG. 4B.
Figure 6B:
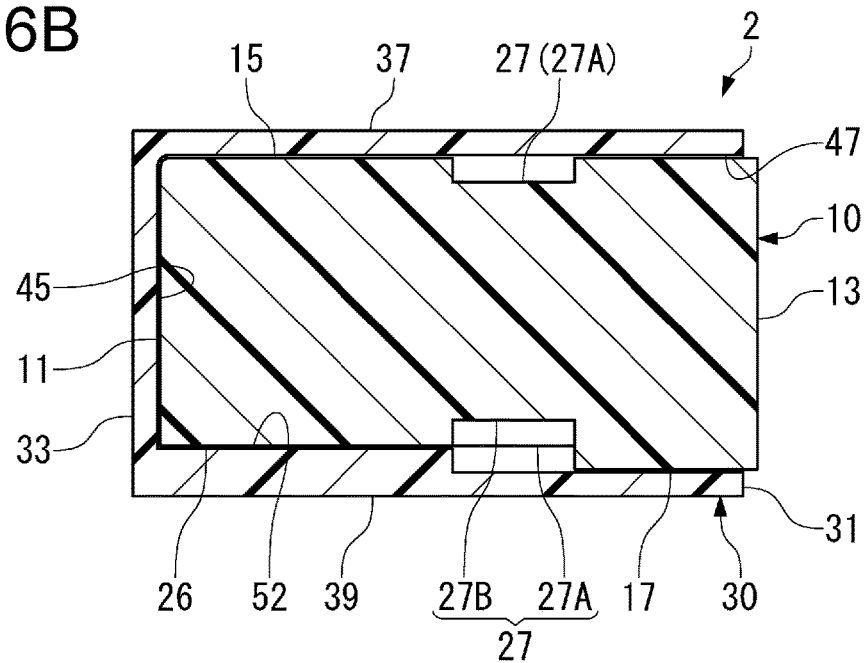
FIG. 6B is a sectional view of the electrical connector assembly corresponding to the section of FIG. 4C.
Figure 7A:
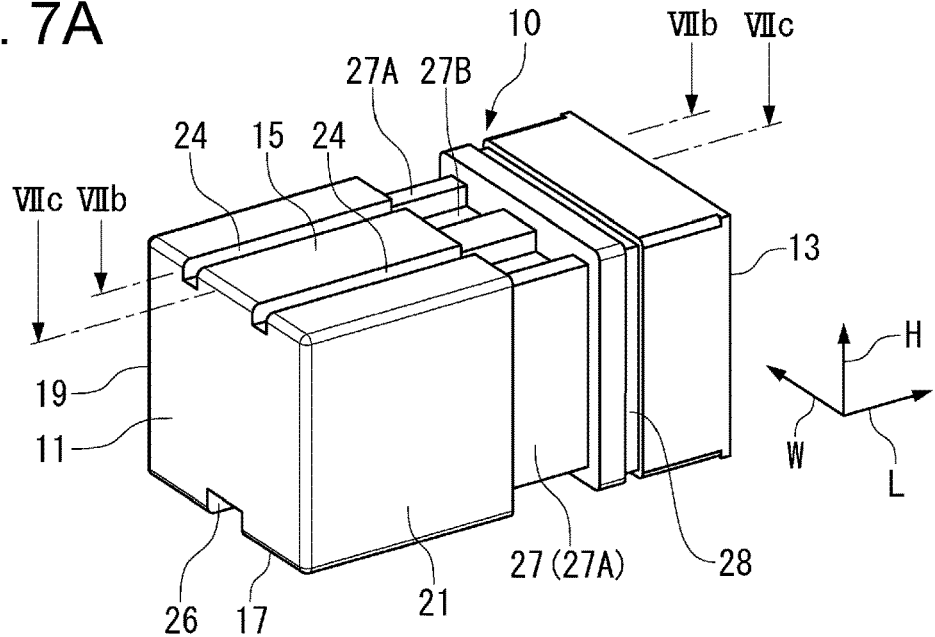
FIG. 7A is a perspective view of a first housing of another electrical connector assembly according to the invention.
Figure 7B:
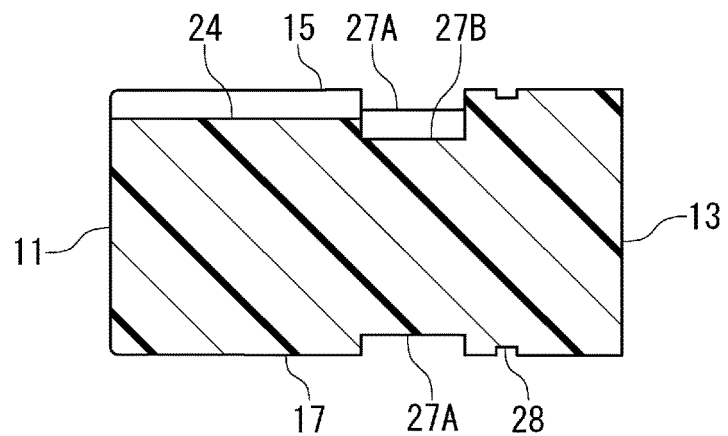
FIG. 7B is a sectional view of the first housing taken along line VIIb-VIIb of FIG. 7A.
Figure 7C:
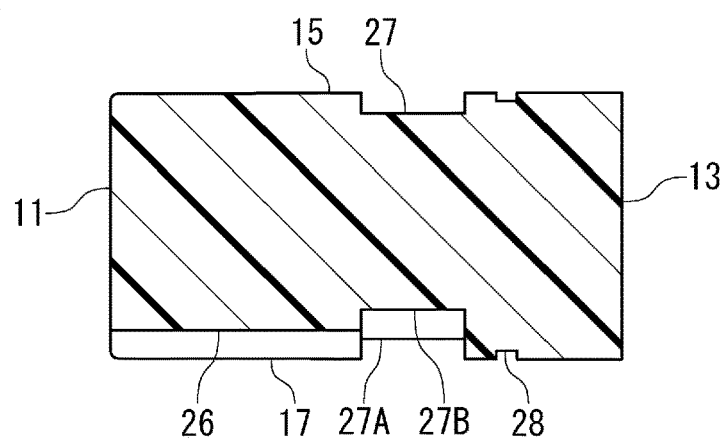
FIG. 7C is a sectional view of the first housing taken along line VIIc-VIIc of FIG. 7A.
Figure 8A:
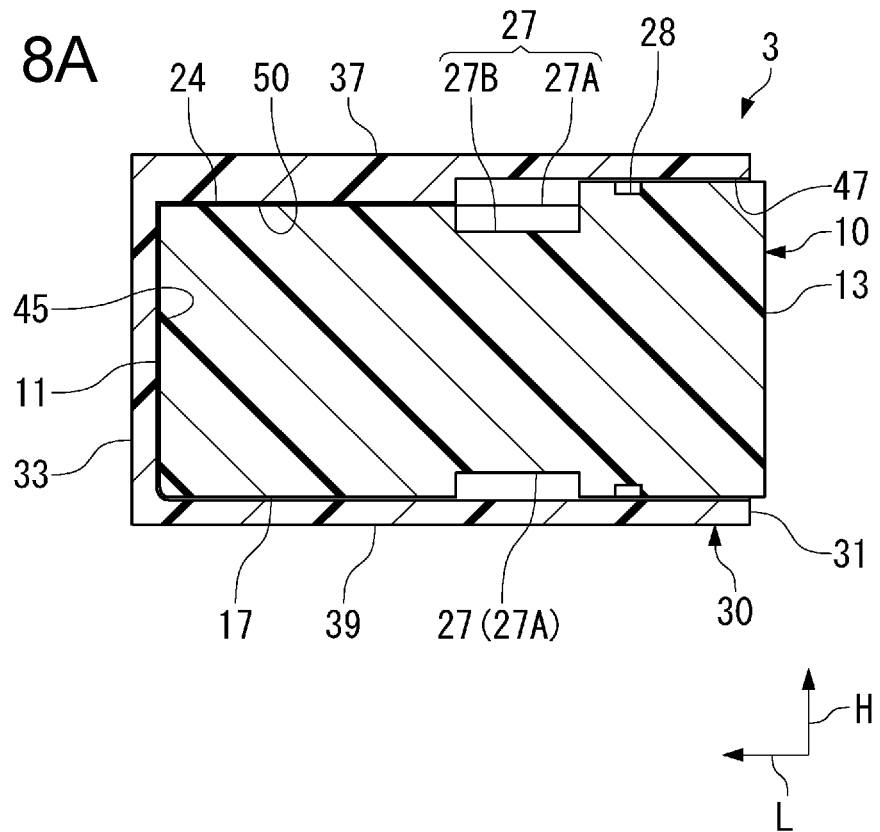
FIG. 8A is a sectional view of the electrical connector assembly corresponding to the section of FIG. 7B.
Figure 8B:
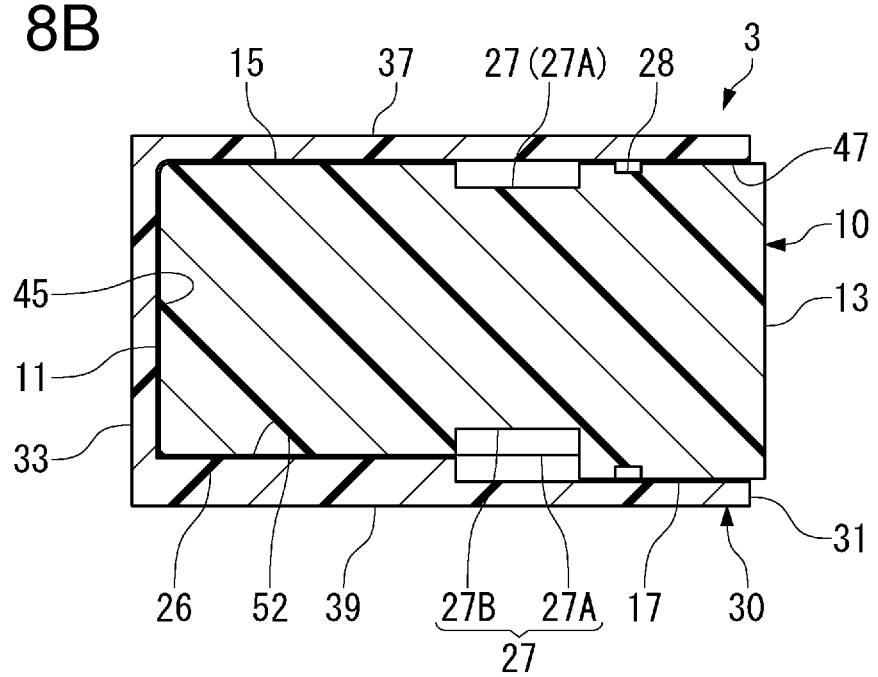
FIG. 8B is another sectional view of the electrical connector assembly corresponding to the section of FIG. 7C.

Like in the electrical connector assembly 1, in the electrical connector assembly 2, when the first housing 10 is inserted into the mating opening 47 of the second housing 30 from the front end 11 of the first housing 10 and the first housing 10 is pressed until the front end 11 thereof reaches the back wall 45 of the second housing 30, the first housing 10 is brought into a mating complete state shown in FIGS. 6A and 6B. However, the range in which the upper guide grooves 24 and the upper guide ridges 50 are mutually guided and the range in which the lower guide groove 26 and the lower guide ridge 52 are mutually guided are limited to a region extending to the water stop groove 27.

As shown in FIGS. 6A and 6B, in the electrical connector assembly 2, the upper guide grooves 24 and the upper guide ridges 50 and the lower guide groove 26 and the lower guide ridge 52 are not provided between the water stop groove 27 and the mating opening 47 in the mating direction L. Consequently, the water WD at the mating opening 47 is prevented from flowing to the water stop groove 27 through a gap between the upper guide grooves 24 and the upper guide ridges 50 and a gap between the lower guide groove 26 and the lower guide ridge 52. In this case, as in the electrical connector assembly 1 shown in FIGS. 9A-9C, between the water stop groove 27 and the mating opening 47, the water WD can flow through, for example, the gap G between the upper wall 15 and the upper wall 37, each of which is flat, until the water reaches the water stop groove 27.

An electrical connector assembly 3 according to another embodiment of the invention is shown in FIGS. 7A-8B. The basic structure of the electrical connector assembly 3 and the features of the electrical connector assembly 3 that the water stop groove 27 is provided and the upper guide grooves 24, the lower guide groove 26, the upper guide ridges 50, and the lower guide ridge 52 are provided only on the front side of the water stop groove 27 are the same as those of the electrical connector assembly 2. However, the electrical connector assembly 3 includes a rear guide groove 28 that is formed on the rear side of the water stop groove 27. The elements of the electrical connector assembly 3 that are the same as those of the electrical connector assembly 2 are denoted by reference symbols in FIGS. 7A-8B that are the same as those in FIGS. 4A-6B, and thus descriptions thereof are omitted.

As shown in FIGS. 7A-8B, the electrical connector assembly 3 includes the rear guide groove 28 which is adjacent to the water stop groove 27 of the first housing 10. The rear guide groove 28 is provided between the water stop groove 27 and the rear end 13, on the rear side of the water stop groove 27 in the mating direction L. Like the water stop groove 27, the guide groove 28 is continuously formed in the circumferential direction of the first housing 10. However, the width and depth of the guide groove 28 are smaller than those of the water stop groove 27; the guide groove 28 is formed so as to have an opening area smaller than that of the water stop groove 27. The guide groove 28 is not formed so as to cause the surface tension ST on the water WD, but instead, the water WD enters the guide groove 28. Specifically, the water WD flowing in the gap G between, for example, the upper wall 15 and the upper wall 37 as shown in FIGS. 9A-9C enters and is filled in the guide groove 28 before reaching the water stop groove 27, and the momentum of the water WD is reduced. Accordingly, even when the water WD fills and overflows the guide groove 28 and reaches the water stop groove 27, the water stop function can be enhanced due to the surface tension ST of the water stop groove 27.

Figure 10A:
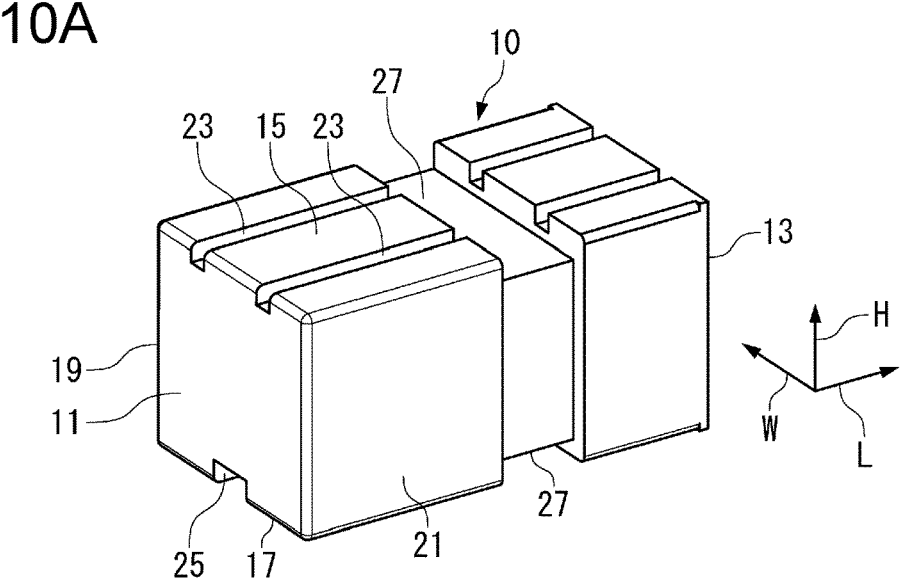
FIG. 10A is a perspective view of a first housing of another electrical connector assembly according to the invention.

In the embodiments shown in FIGS. 1A-9C, the water stop groove 27 extends fully around the circumferential direction of the first housing 10. However, the present invention is not limited to this structure. For example, as shown in FIG. 10A, the water stop groove 27 may be provided only in a specific region in the circumferential direction. The position where the water stop groove 27 is disposed may be determined in consideration of, for example, whether or not the position is in the region where the water WD is likely to flow.

Figure 10B:
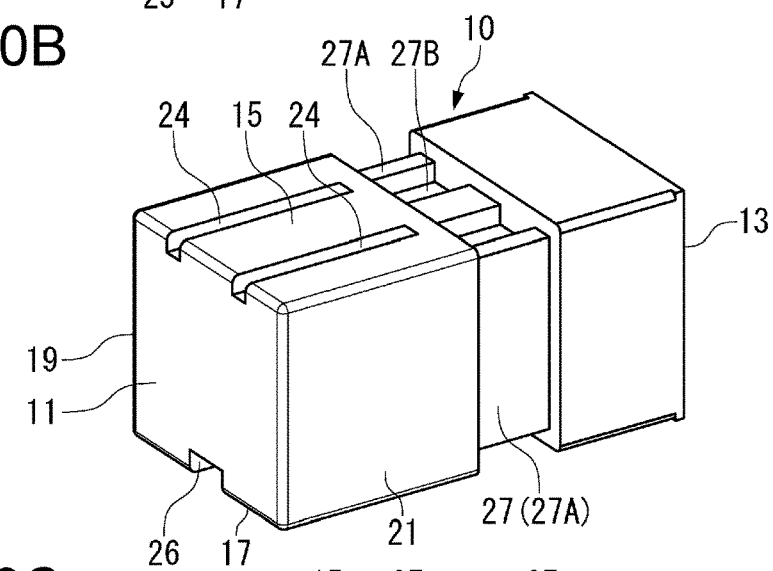
FIG. 10B is a perspective view of a first housing of another electrical connector assembly according to the invention.

As shown in FIG. 10B, the upper guide grooves 24 of the embodiments shown in FIGS. 4A-8B may be formed in such a manner that the upper guide grooves 24 are separate from the water stop groove 27 or are disconnected from the water stop groove 27. Although not shown, the upper guide ridges 50 are formed corresponding to the upper guide grooves 24, respectively. According to this embodiment, even if the water WD enters the water stop groove 27, the water WD can be prevented from advancing in the mating direction L through a gap between the upper guide grooves 24 and the upper guide ridges 50. The lower guide groove 26 and the lower guide ridge 52 may also be formed in such a manner that the lower guide groove 26 is separate from the water stop groove 27 or disconnected from the water stop groove 27.

Figure 10C:
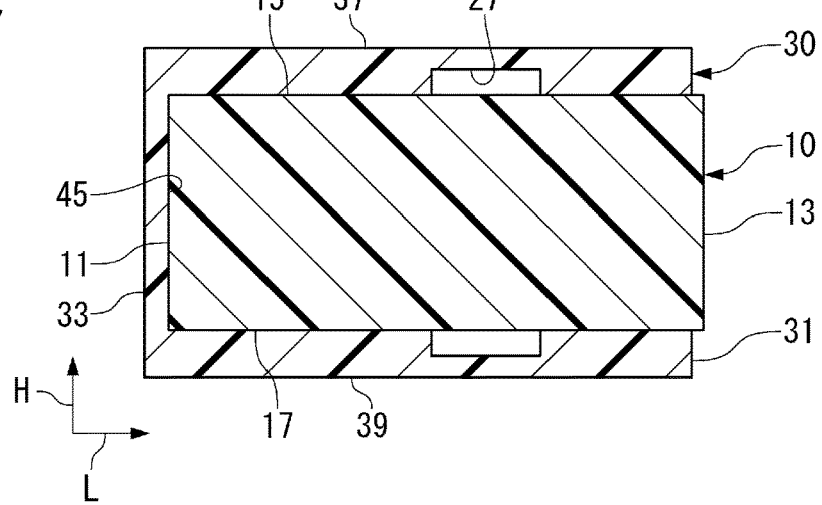
FIG. 10C is a sectional view of another electrical connector assembly according to the invention.

In another embodiment shown in FIG. 10C, even when the water stop groove 27 is provided in an inner peripheral surface of the second housing 30, the water stop effect similar to that in the above embodiments can be achieved. That is, the water stop groove 27 of the present invention may be disposed anywhere between the first housing 10 and the second housing 30.

What is claimed is:

1. An electrical connector assembly, comprising:
a first electrical connector having a first housing including a water stop groove extending along a circumferential direction of the first housing orthogonal to a mating direction of the first electrical connector, and
an upper wall disposed in a region between an end of the first housing and the water stop groove; and
   a second electrical connector having a second housing, a gap formed between the upper wall of the first housing and the second housing when the first electrical connector is mated with the second electrical connector along the mating direction, the water stop groove dimensioned to allow a surface tension to act on a quantity of water accumulated in the gap.

2. The electrical connector assembly of claim 1, wherein the first housing has an upper guide groove extending along the upper wall of the first housing in the mating direction.

3. The electrical connector assembly of claim 2, wherein the second housing has an upper guide ridge extending along an inner surface of an upper wall of the second housing in the mating direction.

4. The electrical connector assembly of claim 3, wherein the upper guide ridge engages the upper guide groove to guide mating of the first electrical connector with the second electrical connector.

* * * * *